(12) United States Patent
Schötzau et al.

(10) Patent No.: US 12,318,744 B2
(45) Date of Patent: Jun. 3, 2025

(54) ASYMMETRICAL THREE-BLADE SCREW-TYPE SHAFT FOR A MIXING AND KNEADING MACHINE

(71) Applicant: BUSS AG, Pratteln (CH)

(72) Inventors: Martin Schötzau, Augst (CH); Wolfgang Walter, Aalen (DE)

(73) Assignee: BUSS AG, Pratteln (CH)

( * ) Notice: Subject to any disclaimer, the term of this patent is extended or adjusted under 35 U.S.C. 154(b) by 0 days.

(21) Appl. No.: 18/134,807

(22) Filed: Apr. 14, 2023

(65) Prior Publication Data

US 2023/0249143 A1 Aug. 10, 2023

Related U.S. Application Data

(63) Continuation of application No. 16/756,726, filed as application No. PCT/EP2018/076883 on Oct. 2, 2018, now Pat. No. 11,779,891.

(30) Foreign Application Priority Data

| Oct. 17, 2017 | (EP) | 17196908 |
| Jan. 19, 2018 | (EP) | 18152448 |
| Apr. 30, 2018 | (EP) | 18170198 |

(51) Int. Cl.
    *B01F 27/724*     (2022.01)
    *B01F 27/1143*     (2022.01)
    (Continued)

(52) U.S. Cl.
    CPC ........ *B01F 27/724* (2022.01); *B01F 27/1143* (2022.01); *B29B 7/421* (2013.01);
    (Continued)

(58) Field of Classification Search
    CPC ................. B01F 7/086; B01F 7/00416; B01F 2215/0049; B01F 2215/0422;
    (Continued)

(56) References Cited

U.S. PATENT DOCUMENTS

| 3,169,752 | A | * | 2/1965 | Laubarede | .............. | B29C 48/68 |
| | | | | | | 366/80 |
| 3,458,894 | A | * | 8/1969 | Wheeler | ................. | B29B 7/423 |
| | | | | | | 366/90 |

(Continued)

FOREIGN PATENT DOCUMENTS

| CA | 1016316 A | 8/1977 |
| CH | 278575 A | 10/1951 |

(Continued)

OTHER PUBLICATIONS

International Search Report for corresponding PCT Application No. PCT/EP2018/076883 mailed Nov. 26, 2018.

*Primary Examiner* — Charles Cooley
(74) *Attorney, Agent, or Firm* — Wood, Phillips, Katz, Clark & Mortimer (57) ABSTRACT

A worm shaft for a mixing and kneading machine in particular for continuous preparation processes, comprising a shaft rod, on the circumferential surface of which blade elements are arranged which are spaced apart from one another and which extend outward from the circumferential surface of the shaft rod, wherein the blade elements are arranged on the shaft rod, at least in one section extending in the axial direction of the worm shaft, in three rows extending in the axial direction of the worm shaft, wherein at least one of the blade elements of one of the rows is different from one of the blade elements of one of the other rows, and/or the rows of blade elements, viewed in cross-section of the shaft rod, are distributed irregularly over the circumference defined by the outer circumferential surface of the shaft rod, and wherein the angular distance between the midpoints M of the outer circumferential surfaces of the blade elements on the circumferential surface of the shaft rod of adjacent rows differs between at least two of the three rows of the at least other two rows, and including wherein, (Continued)

for example, each of the blade elements of the at least one section extending in the axial direction of the worm shaft has a longitudinal extension which extends in an angle of 45° to 135° to the axial direction of the worm shaft.

12 Claims, 6 Drawing Sheets

(51) Int. Cl.
    *B01F 101/00*     (2022.01)
    *B29B 7/42*     (2006.01)
    *B29C 48/45*     (2019.01)
    *B29C 48/565*     (2019.01)
    *B29C 48/685*     (2019.01)

(52) U.S. Cl.
    CPC .............. *B29B 7/423* (2013.01); *B29B 7/429* (2013.01); *B29C 48/45* (2019.02); *B29C 48/565* (2019.02); *B29C 48/687* (2019.02); *B01F 2101/2805* (2022.01); *B01F 2215/0422* (2013.01)

(58) Field of Classification Search
    CPC ................ B01F 27/724; B01F 27/1143; B01F 2101/2805; B29C 48/45; B29C 48/565; B29C 48/687; B29B 7/421; B29B 7/423; B29B 7/429; B29B 7/428; B29B 7/523; B29B 7/422; B29B 7/425; B29B 7/426
    USPC ....................................................... 366/80–81
    See application file for complete search history.

(56) References Cited

U.S. PATENT DOCUMENTS

| | | | | |
|---|---|---|---|---|
| 3,486,194 A * | 12/1969 | Parks | ...................... | B29B 7/421 425/204 |
| 3,618,903 A * | 11/1971 | Ronner | .................... | B29B 7/421 366/289 |
| 3,751,015 A * | 8/1973 | Hensen | ................. | B29C 48/565 366/81 |
| 3,938,783 A * | 2/1976 | Porter | .................... | B29B 7/7414 366/98 |
| 3,981,658 A * | 9/1976 | Briggs | .................... | B29B 7/429 425/205 |
| 4,304,054 A * | 12/1981 | Nauck | ....................... | F26B 5/14 34/183 |
| 4,538,917 A * | 9/1985 | Harms | .................. | B29C 48/767 366/90 |
| 5,044,759 A * | 9/1991 | Gagliani | ................. | B29B 7/421 366/88 |
| 5,302,019 A | 4/1994 | Henschel et al. | | |
| 6,250,791 B1 | 6/2001 | Schneider | | |
| 6,547,431 B1 * | 4/2003 | Womer | ................. | B29C 48/505 366/81 |
| 7,909,500 B2 * | 3/2011 | Grutter | ................. | B29C 48/397 366/322 |
| 9,168,676 B2 * | 10/2015 | Siegenthaler | ........... | B29B 7/423 |
| 11,779,891 B2 * | 10/2023 | Schötzau | ................ | B29B 7/428 366/80 |
| 2005/0270894 A1 * | 12/2005 | Gates | .................. | B29C 48/2564 366/82 |
| 2007/0183253 A1 * | 8/2007 | Siegenthaler | ........... | B29B 7/423 366/80 |
| 2009/0027994 A1 * | 1/2009 | Grutter | ................. | B29C 48/397 366/79 |
| 2010/0284236 A1 * | 11/2010 | Franz | ...................... | B29C 48/04 366/75 |
| 2012/0188840 A1 * | 7/2012 | Blach | .................... | B29C 48/435 366/85 |
| 2020/0238235 A1 * | 7/2020 | Schotzau | ................ | B29B 7/421 |
| 2020/0282598 A1 * | 9/2020 | Schotzau | ................ | B29C 48/45 |

FOREIGN PATENT DOCUMENTS

| | | | |
|---|---|---|---|
| CH | 464656 A | 10/1968 | |
| CH | 695934 A5 | 10/2006 | |
| CH | 701030 A2 * | 11/2010 | .......... B01F 7/00425 |
| DE | 2235784 A1 | 1/1974 | |
| DE | 2307616 A1 | 9/1974 | |
| DE | 3132429 A1 | 2/1983 | |
| DE | 4141328 C1 | 2/1993 | |
| DE | 69212748 T2 | 1/1997 | |
| DE | 60100970 T2 | 7/2004 | |
| EP | 82494 A1 | 6/1983 | |
| EP | 0140846 A2 | 5/1985 | |
| EP | 1247454 A1 | 10/2002 | |
| EP | 1815958 A1 | 8/2007 | |
| EP | 1829660 A2 * | 9/2007 | .......... B29C 48/405 |
| EP | 2018946 A2 * | 1/2009 | ............ B29B 7/423 |
| EP | 3473404 A1 * | 4/2019 | ............ B29B 7/428 |
| JP | 2014091320 A * | 5/2014 | ............ B29B 7/421 |

\* cited by examiner

ASYMMETRICAL THREE-BLADE SCREW-TYPE SHAFT FOR A MIXING AND KNEADING MACHINE

FIELD OF THE INVENTION

The present invention relates to a worm shaft for a mixing and kneading machine, in particular for continuous preparation processes, a corresponding worm shaft section, a housing comprising such a worm shaft or such a worm shaft section as well as a mixing and kneading machine for continuous preparation processes comprising such a housing.

BACKGROUND OF THE INVENTION

Such mixing and kneading machines with such worm shafts are used in particular for preparing malleable and/or pasty substances. For example, they are used for processing viscoplastic substances, for homogenizing and plasticizing plastics, rubbers, and the like, incorporating filler and reinforcement materials, as well as the production of base materials for the food industry. The worm shaft hereby constitutes the working element which transports or conveys the material to be processed forward in an axial direction and thereby mixes the components of the material with one another.

Such mixing and kneading machines are especially suited for the production of polymer granulate, polymer extrusion profiles, polymer moulded parts and the like. In the mixing and kneading machine, a homogeneous polymer melt is thereby produced, which is then conveyed to a discharge device, for example, and from there, for example, to a granulating device, a shaft, a conveyer belt or the like.

Such mixing and kneading machines are for example known from CH 278 575 A and CH 464 656.

In these mixing and kneading machines, the worm shaft preferably carries out not only a rotary motion, but at the same time also moves in the axial direction, i.e. in the longitudinal direction of the worm shaft, translationally forward and back. The movement sequence therefore is preferably characterized in that the worm shaft—viewed in the axial direction—executes an oscillating movement being superimposed over the rotation. This movement sequence allows the incorporation of components, namely kneading elements such as kneading bolts or kneading cogs, into the housing of the mixing and kneading machine. Due to the presence of the kneading elements, the worm conveyor being arranged on the main shaft, the so-called shaft rod—does not run continuously—seen in the cross-section—but is subdivided into a plurality of individual blade elements, each of which extends over a specific angle section of the cross-sectional circumference of the shaft rod. Adjacent blade elements are spaced from one another both in the axial direction and in the outer peripheral direction of the shaft bar, i.e. between adjacent blade elements both in the axial direction and in the outer peripheral direction of the shaft rod a gap is provided. If for example the entire shaft rod of the worm shaft or an axial section of the shaft rod of the worm shaft, viewed in the cross-section of the shaft rod, comprises three blade elements, each of which extends over an angle section of for example 100° of the cross-sectional circumference of the shaft rod, this is described as a three-blade worm shaft or a three-blade worm shaft section if this blade element arrangement does not extend over the entire axial length of the shaft rod, but only over a section thereof. The rotation and the translational movement of the worm shaft in the axial direction are controlled such that the individual blade elements, during rotation and the translational movement, move with their flanks into proximity with the corresponding kneading elements so as to compact the material to be mixed and kneaded, and to exert a shearing action on the latter, so as in this way to promote the mixing and/or kneading, without the kneading elements colliding with the blade elements. Furthermore, the kneading elements, because they approach the flanks of the blade elements during rotation and translational motion of the worm shaft, prevent deposits of mixture components on the flanks of the blade elements, so that the kneading elements as a result also effect a cleaning of the blade elements. Naturally the quantity and the geometry of the blade elements must be tailored to the quantity of kneading elements. Usually, the individual kneading elements are arranged on the inner peripheral surface of the housing of the mixing and kneading machine—in the axial direction—in several rows of axially spaced kneading elements, said rows being coordinated to the geometry and quantity of the blade elements and extending over at least one axial section of the inner peripheral surface of the housing. The individual kneading elements are hereby screwed into holes or receptacles provided in the inner wall of the housing—seen in the housing interior wall. In addition, the blade elements of known worm shafts are symmetrically configured, i.e. the three blade elements of a three-blade worm shaft each has the same shape and the same dimensions and are equally distributed on the circumferential surface of the shaft rod, so that the midpoints of the three blade elements are each displaced by 120° on the circumferential surface of the shaft rod. In adaptation thereto, on the inner circumferential surface of the housing of the mixing and kneading machine, three rows of receptacles displaced by 120° are arranged for kneading elements. In the case of a four-bladed worm shaft, the midpoints of the four blade element elements are each displaced by 90° on the circumferential surface of the circumferential surface of the shaft rod, and four rows of receptacles for kneading elements each being displaced by 90° are accordingly arranged on the inner circumferential surface of the housing of the mixing and kneading machine.

Frequently the described mixing and kneading machines are subdivided in the axial direction into different process sections, wherein each process section, according to its allocated task during the operation, is provided with a corresponding quantity or geometry of blade elements and kneading elements. For example a mixing and kneading machine in the axial direction, depending on the material to be mixed, comprises an feed-in section disposed at the upstream end, in which the components to be mixed or kneaded are loaded into the machine, a melting section just downstream of this, in which the components are melted, a mixing and dispersing section, in which possible aggregates of the material components are crushed and mixed as homogeneously as possible with one another, and a degassing section, in which the mixture is degassed. It has already been proposed that a different number of kneading elements be provided in individual sections of the mixing and kneading machine than in other sections, so as to adapt conditions in the individual sections to the requirements of the different process section. It is therefore possible to provide a housing shell with—when viewed in the axial direction—several mutually separated housing shell sections, which makes it possible to equip individual axial sections of the housing with a different number of kneading elements. For example, it is known to configure the worm shaft of a mixing and kneading machine in some sections as three-bladed and in other sections as four-bladed, and to equip the housing shells of the corresponding sections of the inner housing wall of the mixing and kneading machine with three or four rows of receptacles for kneading elements. If the mixing and kneading machine, being optimized for the starting materials to be mixed in this way, should be used for a different application with different starting materials, the mixing and kneading machine must be newly optimized and accordingly modified with respect to the process zones. If in one process section, which previously used a four-bladed worm shaft section as well as a housing shell fitted with four kneading bolts, a three-bladed worm shaft section should be used, then in said section the housing shell being equipped with four rows of kneading bolt receptacles displaced by 90° must be replaced with a housing shell equipped with three rows of receptacles for kneading bolts displaced by 120°. In general, it is laborious in the prior art to adapt a mixing and kneading machine in accordance with a different basic material to be mixed, particularly in terms of the quantity of rows of kneading elements and the corresponding number of blade elements on the worm shaft. In particular, known three-bladed and four-bladed worm shafts or worm shaft sections require special equipment of the corresponding housing sections with receptacles for kneading elements.

BRIEF SUMMARY OF THE INVENTION

It is therefore the object of the present invention to overcome the above-named deficiencies and to provide a three-bladed worm shaft or a three-bladed worm shaft section which also can be used especially in housings or housing sections, which—at least also—is compatible with other worm shaft sections, such as in particular four-bladed worm shaft sections, so that in a mixing and kneading machine a four-bladed worm shaft or a four-bladed worm shaft section can be replaced by the three-bladed worm shaft or the three-bladed worm shaft section, without it being necessary to change the housing or housing shells, but rather at most some of the kneading bolts must be repositioned from one row of receptacles to a different row.

According to the invention, this object is achieved by a worm shaft for a mixing and kneading machine in particular for continuous preparation processes, which comprises a shaft rod, on the circumferential surface of which blade elements are arranged which are spaced apart from one another and which extend outward from the circumferential surface of the shaft rod, wherein the blade elements are arranged on the shaft rod, at least in one section extending in the axial direction of the worm shaft, in three rows extending in the axial direction of the worm shaft, wherein at least one of the blade elements of one of the rows is different from one of the blade elements of one of the other rows, and/or the rows of blade elements, viewed in cross-section of the shaft rod, are distributed irregularly over the circumference defined by the outer circumferential surface of the shaft rod. Consequently, the present invention relates to a three-bladed worm shaft which is asymmetrical at least in sections.

In that the worm shaft according to the invention is configured asymmetrically as three-bladed at least in sections, it can also be used in a housing of a mixing and kneading machine which is compatible with other worm shaft sections, such as in particular with four-bladed worm shaft sections. Therefore, the section of the worm shaft according to the invention configured asymmetrically as three-bladed can replace a worm shaft section configured as four-bladed, without requiring replacement of the housing or housing shells. This is because the worm shaft according to the invention configured asymmetrically as three-bladed at least in sections can be used in housings whose receptacles for kneading elements, at least in one section extending in the axial direction of the housing, seen in the cross-section of the housing, are distributed irregularly in a section over the circumference being defined by the inner circumferential surface of the housing or the housing shell. An irregular distribution of the receptacles for kneading elements over the circumference defined by the inner circumferential surface of the housing is hereby understood to be that—considered in the cross-section of the housing—of all the distances between any two receptacles for kneading elements of the adjacent rows on the inner circumferential surface of the housing, at least two distances are different from one another. Through this irregular arrangement of the receptacles for kneading elements, it is achieved that several variants of occupations of the receptacles with respect to the number and arrangement of the kneading elements can be simply realised, and namely while maintaining an optimal effectiveness of the mixing and kneading machine with regard to material throughput per unit of time. For example, on the housing inner circumferential surface, if there are six rows of receptacles provided for kneading elements and extending in an axial direction of the mixing and kneading machine, then due to the irregular distribution, viewed in cross-section, of the rows of receptacles for kneading elements on the inner circumferential surface of the housing, it is effected that, as an alternative to occupation of all rows or of four rows with kneading elements, the occupation of only three rows with kneading elements can be provided and three of the receptacle rows can be unfilled, wherein nonetheless the occupied rows are arranged at a distance from each other such that an optimal effectiveness of the mixing and kneading machine with regard to material throughput per unit of time is achieved. A receptacle for kneading elements, within the meaning of the present invention, is a hollow space on the inner circumferential surface of the housing which is configured such that a kneading element, thus a kneading bolt, a kneading cog, or the like is arranged therein, and can be secured by it, so that the kneading element extends radially inward from the inner circumferential surface of the housing into the hollow inner space. The receptacle can be a recess, an opening, a drilled hole, or the like which extends more or less deeply from the inner circumferential surface of the housing into the housing. Preferable at least one of the receptacles is a recess, an opening, or a drilled hole and preferably each of the receptacle is a recess, an opening, or a drilled hole. In the case of a typical two-component design of the housing from an outer housing and a housing shell arranged radially inward thereon, the receptacle extends from the inner circumferential surface of the housing shell into the latter and optionally also into the outer housing, and optionally through the outer housing. In the case of a single-component design of the housing, the receptacle thus extends from the inner circumferential surface of the housing into the latter and optionally through the latter.

According to the invention, the worm shaft on the circumferential surface of the shaft rod has blade elements extending outward which are arranged on the circumferential surface of the shaft rod, at least in one section extending in the axial direction of the worm shaft, in three rows extending in the axial direction of the worm shaft. This three-bladed section comprises—apart from the blade elements arranged in the three rows—no further blade elements, thus also no individual blade elements arranged between these rows. Here a row of blade elements extending in the axial direction of the worm shaft over at least one section of the (outer) circumferential surface of the shaft rod, within the meaning of the present invention, is understood to mean that a connecting line being positioned over the centre points of the blade elements of a row, said blade elements being spaced from one another in the axial direction, is at least substantially a straight line, wherein the maximal deviation of the connecting line from a straight line is less than 10°, preferably less than 5°, and more preferably less than 2°. Here the midpoint of a blade element is understood to be the point that lies in the middle of the length of the outer circumferential surface of the blade element, wherein the length is the longest extension or longitudinal extension of the outer circumferential surface of the blade element, thus the longest possible straight line between two different points on the outer circumferential surface of the blade element.

As shown, the blade elements are arranged on the circumferential surface of the shaft rod at least in one section extending in the axial direction of the worm shaft, in three rows. The other axial sections of the worm shaft can be differently configured, namely for example two-bladed, four-bladed, or alternately two-bladed and four-bladed. The worm shaft according to the present invention can also comprise two, three, or a number of three-bladed sections, which are each separated from the others by one or a number of other sections, wherein these one or more other sections again can in turn be designed to be two-bladed, four-bladed or alternately two-bladed and four-bladed.

According to the invention, at least one of the blade elements of one of the rows of one of the blade elements is different to one of the blade elements of one of the other rows, and/or the rows of the blade elements are distributed, when viewed in the cross-section of the shaft rod, irregularly over the circumference defined by the outer circumferential surface of the shaft rod.

According to a first particularly preferable embodiment of the present invention, this is achieved in that at least one of the blade elements of one of the rows of the at least one section extending in the axial direction of the worm shaft is shorter and/or narrower than at least one other of the blade elements of one of the other two rows. Consequently, with this embodiment of the present invention, the dimensions of the blade elements of different rows differ from one another, namely in terms of the length and/or the width of the blade elements. Thereby the length of the outer circumferential surface of a blade element in this context, as presented above, is the longest straight extension of the outer circumferential surface of the blade element. In addition, the width B of the outer circumferential surface of a blade element in this regard is the longest straight extension of the outer circumferential surface of the blade element which extends perpendicularly to the length of the blade element. The individual blades can hereby have the same form or a different form. For example, all blade elements can have a biconvex outer circumferential surface, wherein the length of the blade elements of one row is longer than that of another row. Likewise, however the blade elements can differ in shape, thus the blade elements of a row can have a biconvex outer circumferential surface and the blade elements of another row can have a parallelogram-shaped outer circumferential surface, wherein the width of the blade elements of one row is greater than that of another row.

According to a second particularly preferable embodiment of the present invention, the angular distance between the midpoints M of the outer circumferential surfaces of the blade elements on the circumferential surface of the shaft rod of adjacent rows between at least two of the three rows differ from the angular distance between at least two other rows. The blade elements of all three rows can consequently have the same shape as well as the same dimensions, if the rows of blade elements, viewed in the cross-section of the shaft rod, are distributed irregularly over the circumference defined by the outer circumferential surface of the shaft rod. Alternatively thereto, the blade elements of all three rows can have a different shape.

According to a third particularly preferable embodiment of the present invention, at least one of the blade elements of one of the rows of the at least one section extending in the axial direction of the worm shaft is shorter and/or narrower than at least one other of the blade elements of one of the other two rows and the angular distance between the midpoints M of the outer circumferential surfaces of the blade elements on the circumferential surface of the shaft rod of adjacent rows between at least two of the three rows differs from the angular distance between at least two other rows. In this embodiment as well, the blade elements of all three rows can have the same shape or a different shape.

As is usually the case in the mixing and kneading machines in question, the shaft rod of the worm shaft according to the invention preferably has a circular cross-section, wherein the individual blade elements extend radially outward from the circumferential surface of the shaft rod.

The present invention is thereby not limited with regard to the type of manufacture of the worm shaft. For example, the worm shaft can be made by means of milling a metal cylinder to form the blade elements or by means of welding the blade elements onto a shaft rod. For practical purposes however, the worm shaft is manufactured by mounting individual worm shaft sections onto a base rod, wherein each worm shaft section comprises for example two rows each of 1 to 4 adjacent blade elements.

In a further embodiment of the inventive concept, it is proposed that at least 80%, preferably at least 90%, especially preferably at least 95%, quite especially preferably at least 99%, and most preferably all the blade elements of each row of the at least one section extending in the axial direction of the worm shaft are equal to one another.

Consequently, all blade elements of the first row each have the same shape and dimensions as well as the same length and width. Likewise, all blade elements of the second row each have the same shape and dimensions and all blade elements of the third row each have the same shape and dimensions, wherein the blades between at least two of the three rows differ from one another and/or the rows of the blade elements, viewed in cross-section of the shaft rod, are irregularly distributed over the circumference defined by the outer circumferential surface of the shaft rod.

The length of the worm shaft section extending in the axial direction, in which the blade elements are arranged in three rows extending in the worm shaft axial direction, is preferably at least 0.2 D (i.e. at least over a distance corresponding to 20% of the diameter), preferably at least 5 D (i.e. over a distance corresponding to at least 5 times the diameter), especially preferably at least 10 D (i.e. at least over a distance corresponding to 10 times the diameter), and quite especially preferably at least 25 D (i.e. over a distance corresponding to 25 times the diameter) of the length of the worm shaft.

According to a further particularly preferable embodiment of the present invention, the blade elements of the individual rows are oriented such that their longitudinal extension on the circumferential surface of the shaft rod extends perpendicular to the longitudinal direction of the worm shaft or extends at an incline at a comparably small angle to the perpendicular of the longitudinal direction of the worm shaft. Consequently it is preferred that each of the blade elements of the at least one section extending in the axial direction of the worm shaft has a longitudinal extension which extends at an angle of 45° to 135°, preferably from 60° to 120°, especially preferably from 70° to 110°, and quite especially preferably i) from 75° to 85° or ii) from 95° to 105° or iii) from more than 85° to less than 95°, for instance 90°, in the axial direction of the worm shaft. Alternatively thereto, it is also possible, even if less preferable according to the present invention, that at least 50%, alternatively at 80%, and alternatively at least 90% of the blade elements are oriented in this way.

In a further embodiment of the inventive concept, it is proposed that each of the blade elements of the at least one section extending in the axial direction of the worm shaft, in a top view, has an outer circumferential surface in a form being selected from the group consisting of parallelogram-shaped, elliptical, oval, biconvex, modified elliptical, modified oval, modified biconvex, and modified rectangular. Here modified elliptical, modified oval, and modified biconvex means elliptical, oval, or biconvex, wherein the two ends of the outer circumferential surface, viewed in the longitudinal extension of the blade elements, are configured in the form of an edge, of a trapezoid tapering toward the ends, preferably an equilateral trapezoid, or of a triangle tapering toward the ends, preferably an equilateral triangle. Here each of the two lateral flanks can have a straight section, or one of the two lateral flanks can have a straight section, or none of the two lateral flanks can have a straight section. In addition, modified rectangular means that the outer circumferential surface of the blade elements, in a top view, has a middle rectangular section, on whose two ends, viewed in the longitudinal extension of the blade elements, an end section is respectively provided, in each case in the form of a trapezoid or a triangle tapering toward the ends, preferably an equilateral trapezoid or triangle. Here the blade elements of different rows need not have the same shape, so that for example the blade elements of the first row and the blade elements of the third row can have a biconvex outer circumferential surface, whereas the blade elements of the second row can have a parallelogram-shaped outer circumferential surface.

Alternatively to the above-named embodiment, it is also possible, even if this is less preferred according to the present invention, that at least 50%, alternatively at least 80%, and alternatively at least 90% of the blade elements have an outer circumferential surface shape depicted above, or that only the blade elements of one row, or the blade elements of two rows have such an outer circumferential surface shape.

Preferably all blade elements of a row have the same shape, wherein the shape of the blade elements of two of the three rows is the same, and differs from the shape of the blade elements of the third row.

It is equally preferable that all blade elements of all three rows have the same shape, but that the blade elements of at least one row differ from those of another row in its length and/or width.

Good results are achieved particularly if each of the blade elements of the at least one section extending in the axial direction of the worm shaft, in a top view, has a biconvex, modified biconvex, or parallelogram-shaped outer circumferential surface, wherein the shapes of the blade elements of the different rows can differ from one another. For example, the blade elements of the first and third row can have a parallelogram-shaped outer circumferential surface, whereas the blade elements of the second row can have a modified biconvex outer circumferential surface whose lateral flanks each have a straight section. Likewise preferably, the blade elements of all three rows can have a modified biconvex outer circumferential surface, wherein in each case one of the two lateral flanks or both of the two lateral flanks have a straight section, wherein the blade elements of the first and third row are wider than the blade elements of the second row.

In a further embodiment of the inventive concept, it is proposed that the ratio of length to width of each of the blade elements of all three rows is 1 to 30, preferably 2 to 20, especially preferably 5 to 15, and quite especially preferably 6 to 9 or 10 to 12, wherein the longitudinal extension L is the longest straight extension of the outer circumferential surface of the blade element and the width B is the longest straight extension of the outer circumferential surface of the blade element, which extends perpendicularly to the longitudinal extension L of the blade element. The ratios of length to width of the blade elements of different rows can thereby differ from one another.

For example, the ratio of length L to width B of each of the blade elements of two of the three rows can be equal, and differ from the length L to width B ratio of the blade elements of the third row.

Furthermore, it is preferred that the blade elements of two of the three rows of the at least one section extending in the axial direction of the worm shaft are equal to one another, and that the blade elements of the third row have the same shape as the blade elements of the other rows, but are 1 to 25%, preferably 2 to 20%, especially preferably 5 to 15% longer or shorter than the blade elements of the other row.

Alternatively to the above embodiment, it is preferred that the blade elements of two of the three rows of the at least one section extending in the axial direction of the worm shaft are equal to one another and the blade elements of the third row have a different shape than the blade elements of the other row, wherein the blade elements of the other row are 1 to 25%, preferably 2 to 20%, especially preferably 5 to 15% longer or shorter than the blade elements of the other two rows.

In particular, the blade elements of two of the three rows of the at least one section extending in the axial direction of the worm shaft can be equal to one another and the blade elements of the third row can have the same shape as the blade elements of the other rows, but can be 1 to 25%, preferably 2 to 20%, especially preferably 5 to 15% wider or narrower than the blade elements of the other rows.

It is likewise equally possible that the blade elements of two of the three rows of the at least one section extending in the axial direction of the worm shaft are equal to one another and the blade elements of the third row have a different shape from the blade elements of the other row, wherein the blade elements of the other row are 1 to 25%, preferably 2 to 20%, especially preferably 5 to 15% wider or narrower than the blade elements of the other two rows.

According to a further preferred embodiment of the present invention, it is provided that the blade elements of two of the three rows of the at least one section extending in the axial direction of the worm shaft are equal to or different from one another and that the angular distance between the midpoints M of the outer circumferential surfaces of the blade elements of the two rows on the circumferential surface of the shaft rod differs from the angular distances between the midpoint M of the outer circumferential surfaces of the other row and each of the midpoints M of the outer circumferential surfaces of the two rows on the circumferential surface of the shaft rod. Thus the lengths and/or the widths and/or the ratios of length to width of the blade elements of the three rows can be the same or different. The blade elements of the third row can thereby have the same or a different shape than the blade elements of the other rows.

In the above embodiment, it is especially preferred that the angular distance between the midpoints M of the outer circumferential surfaces of the blade elements of two of the three rows of the at least one section extending in the axial direction of the worm shaft on the circumferential surface of the shaft rod is 124° to 146°, preferably 130° to 140°, especially preferably 132° to 138°, particularly preferably 133° to 137°, quite especially preferably 134° to 136°, and most preferably around 135°, and the angular distances between the midpoint M of the outer circumferential surface of the other row and each of the midpoints M of the outer circumferential surfaces of the two rows on the circumferential surface of the shaft rod are 102° to 123°, preferably 107° to 118°, especially preferably 110° to 115°, particularly preferably 111° to 114°, quite especially preferably 112° to 113°, and most preferably around 112.5°.

In a further development of the inventive concept, it is proposed that the axial distances of the two adjacent blade elements of each of the three rows of the at least one section extending in the axial direction of the worm shaft are the same.

Preferably each of the blade elements of two of the three rows of the at least one section extending in the axial direction of the worm shaft—viewed in the cross-section of the shaft rod—extends over the same angular distance of the circumferential surface of the shaft rod and each of the blade elements of the other row extends over a shorter or longer angular section, wherein the difference between the angular distances is preferably 1 to 20% and especially preferably 5 to 15%.

Good results are particularly obtained if each of the blade elements of two of the three rows of the at least one section extending in the axial direction of the worm shaft—viewed in the cross-section of the shaft rod—extends over an angular distance of 20° to 175°, preferably from 45° to 175°, and especially preferably from 60° to 175° of the circumferential surface of the shaft rod and that each of the blade elements of the other of the three rows extends over an angular distance of 20° to 120° and preferably from 20° to 90°. While shorter blade elements achieve a better mixing effect than longer, longer blade elements, especially those that nearly overlap or do overlap in the circumferential direction of the shaft rod, result in a high conveyor quantity per worm shaft diameter and time unit.

In principle, the present invention is not limited with respect to the formation of the flanks of the blade elements of the at least one two-bladed section of the worm shaft. The lateral flanks of the blade elements can therefore extend perpendicularly upwards from the circumferential direction of the shaft rod to the outer circumferential surface of the blade elements. Of course it is preferred that the lateral flanks of the blade elements do not extend perpendicularly upwards from the circumferential direction of the shaft rod to but rather are angled. According to a particularly preferable embodiment of the present invention, it is therefore provided that the lateral flanks of each of the blade elements of the at least one three-bladed section of the worm shaft extend upwards to the outer peripheral surface of the blade elements at an angle $\alpha$ of 1° to 60°, preferably of 2° to 40°, particularly preferably of 3° to 20° and very particularly preferably of 4° to 10° in relation to the cross-sectional plane of the shaft rod. Alternatively, even if it is less preferred, not all but at least 50%, preferably at least 80%, and more preferably at least 90% of all blade elements have flanks that extend in the above-named angle outwards from the circumferential surface of the shaft rod.

A further object of the present invention is a section for a worm shaft having a shaft rod with a circular cross-section, wherein blade elements are arranged at a distance from one another and extending outwards from the circumferential surface of the shaft rod, the blade elements being arranged on the circumferential surface of the shaft rod in three rows extending in the axial direction of the worm shaft, wherein at least one of the blade elements of one of the rows is different from one of the blade elements of one of the other rows and/or the rows of the blade elements, viewed in the cross-section of the shaft rod, are distributed irregularly over the circumference defined by the outer circumferential surface of the shaft rod, each row preferably comprising one, two, three, or four blade elements being axially arranged at a distance from one another.

Furthermore, the present invention relates to a housing of a mixing and kneading machine for continuous preparation processes, wherein a hollow inner space is configured in the housing, in which at least in some sections, an above-described worm shaft or one or more described sections for a worm shaft extend in the axial direction, and wherein on the inner circumferential surface of the housing, receptacles for the kneading elements are arranged which at least in some sections extend into the housing, wherein the receptacles are arranged on the inner circumferential surface of the housing in at least three rows extending in the axial direction over at least one section of the inner circumferential surface of the housing.

Preferably the receptacles on the inner circumferential surface of the housing are arranged in two, three, four, or six, preferably in three, four, or six, especially preferably in four or six, and most preferably in six rows extending in the axial direction over at least one section of the inner circumferential surface of the housing.

In addition it is preferred that the rows of receptacles for kneading elements, viewed in the cross-section of the housing, are irregularly distributed over the inner circumferential surface of the housing.

According to a further preferred embodiment of the present invention, it is provided that the inner circumferential surface of the housing is circular in the cross-section and at least one of the angular distances, when viewed in the cross-section of the housing, between two receptacles of adjacent rows on the inner circumferential surface of the housing with respect to the value of 360°/n deviates by at least 1°, preferably by at least 2.5°, especially preferably by at least 5°, and quite especially preferably by at least 10°, and preferably all angular distances between two receptacles of adjacent rows with respect to the value of 360°/n deviate by at least 1°, preferably by at least 2.5°, especially preferably by at least 5°, and quite especially preferably by at least 10°, n being the number of rows of the receptacles.

In a further embodiment of the inventive concept, it is proposed that three of the rows of receptacles for kneading elements are fitted with kneading elements.

A further object of the present invention is a mixing and kneading machine for continuous preparation processes which comprises a previously described housing. The continuous preparation process can be the production of polymer granulate (e.g. soft PVC, hard PVC, PVC mixtures, chlorinated PVC or wood-plastic composites (WPC)), polymer extruded profiles or polymer moulded parts, the preparation of cable compounds, the production of coatings (such as powder coatings, toners, duo plastics), the calendar feeding (such as PVC, PP, PET, TPE), the production of viscous foodstuffs (such as chewing gum composites), the production of anode pastes and other applications.

BRIEF DESCRIPTION OF THE DRAWINGS

Below the present invention is described in more detail with reference to the drawing, wherein:

FIG. 1b shows a perspective view of the housing of the mixing and kneading machine shown in FIG. 1a;

FIG. 2b shows a top view of the axial section of the worm shaft shown in FIG. 2a;

FIG. 2c shows a lateral top view of the axial section of the worm shaft shown in FIG. 2a;

FIG. 3b shows a top view of the axial section of the worm shaft shown in FIG. 3a;

FIG. 4b shows a top view of the axial section of the worm shaft shown in FIG. 4a;

DETAILED DESCRIPTION OF THE INVENTION

Figure 1A:
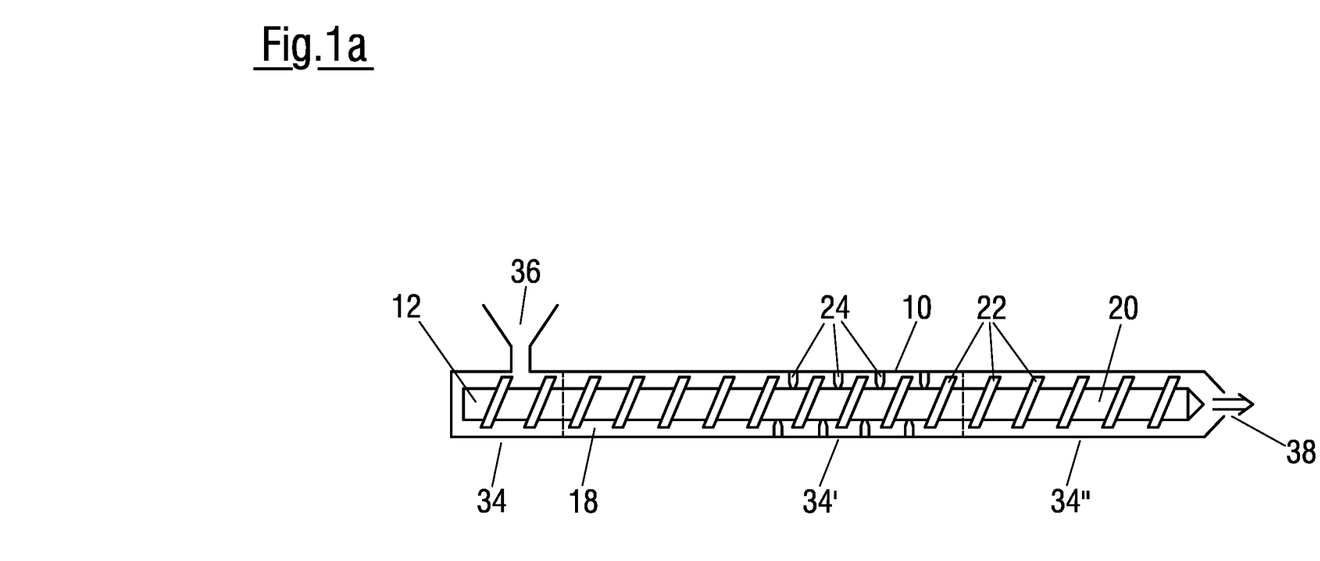
FIG. 1a shows a schematic longitudinal section of a mixing and kneading machine.
Figure 1B:
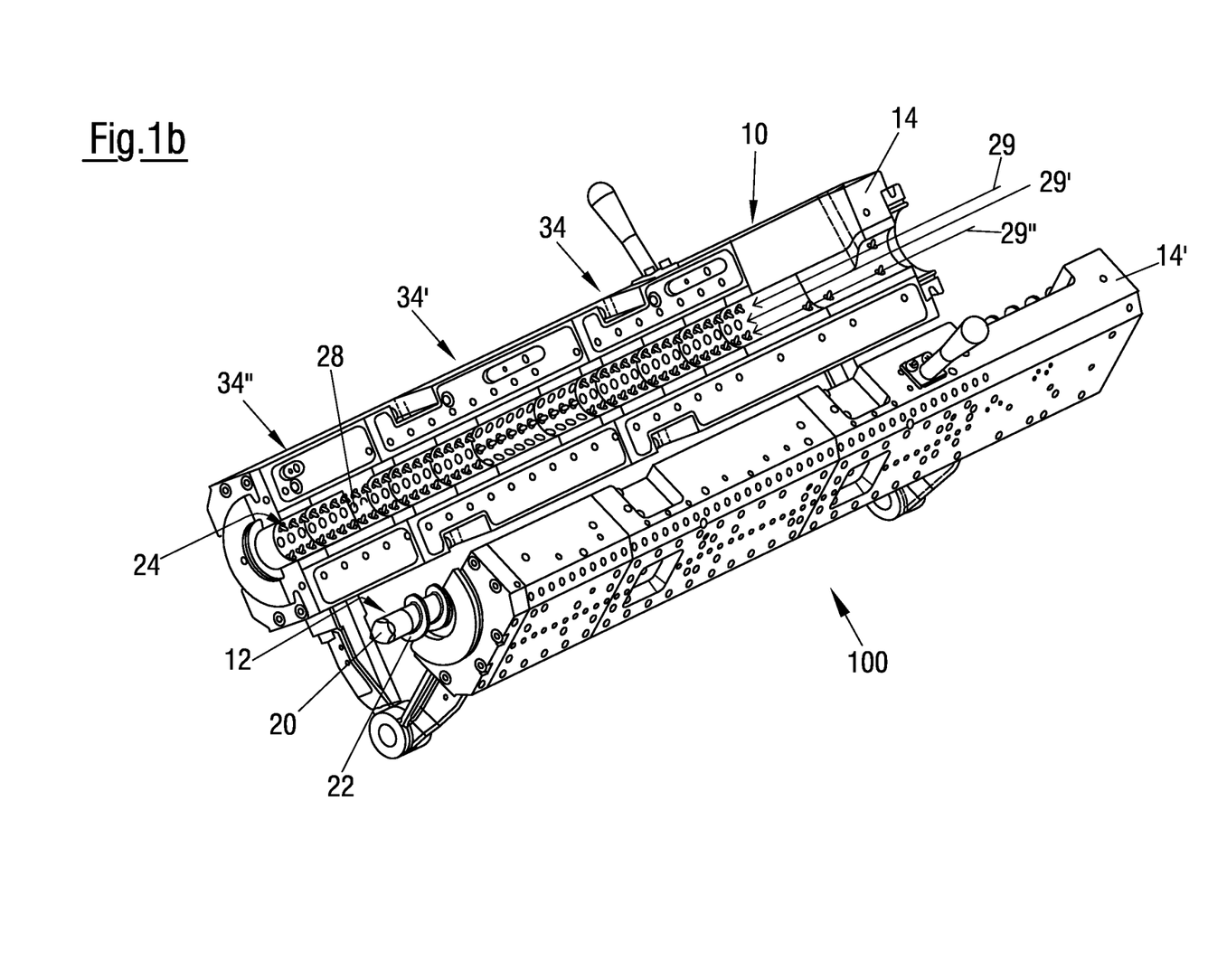

The mixing and kneading machine shown in FIGS. 1a and 1b and as a whole designated as 100 comprises a housing 10 and a worm shaft 12 arranged in the housing 10. The housing 10 comprises two housing halves 14, 14', which are lined on the inside with a so-called housing shell 16. Here the housing shell 16 in the present patent application is considered as a component of the housing 10. The inner circumferential surface of the housing 10, when the two housing halves 14, 14' are closed, delimits a cylindrical hollow inner space 18, thus an inner space 18 with circular cross-section. The worm shaft 12 comprises a shaft rod 20, on the circumferential surface of which blade elements 22 are arranged which extend radially outward on the circumferential surface of the shaft rod 20, wherein the individual blade elements 22 are arranged at a distance from one another. In the two housing halves 14, 14', receptacles 28 are provided for kneading elements 24, i.e. for kneading bolts, kneading cogs, and the like. Here each of the receptacles 28 is a drilled hole 28, which extends from the inner circumferential surface of the housing shell 16 through the housing wall. The lower, radially inwards end of each receptacle 28 can be configured to be square in the cross-section, for example. Each kneading bolt 24 for example can have on its lower end an end which fits precisely into the squarely configured radial inner end of the receptacles 28, and is thereby fixed in a rotationally locked position into the receptacle 28 in the used state. The kneading bolt 24 is connected on its end being positioning in the receptacle 28 with a fixing element (not shown) used in the overlying end of the receptacle 28 by means of screwing. Alternatively, the kneading bolt 24 can also have an internal thread for a screw, and can be affixed with a screw instead of the fixing element and nut.

As follows in particular from FIG. 1b, the equally spaced receptacles 28 for the kneading bolts 24 extend in the form of three rows 29, 29', 29" into each of the two housing halves 14, 14', viewed in the axial direction. Thus the total number of rows of receptacles 29, 29', and 29" of the housing is six. A row within the meaning of the present invention is understood to mean that a connecting line drawn over the axially separated receptacles 28 of a row 29, 29', 29" is a straight line. As shown in FIGS. 1a and 1b, the mixing and kneading machine 100 is subdivided in the axial direction into several process sections 34, 34', 34", wherein each process section 34, 34', 34" is adapted with respect to the number of kneading bolts 24 as well as the number and the extent of the blade elements 22 on the shaft rod 20 to the function of the individual process sections 34, 34', 34". As shown in FIG. 1b, in the section 34 and in the right section 34" of the upper housing halves 14, there are two rows out of the three rows 29, 29', 29" of receptacles 28 for kneading bolts 24, namely the upper row 29 and the lower row 29", fitted with kneading bolts 24, whereas the middle row 29' is not fitted with kneading bolts 24. In contrast to this, of the three rows 29, 29', 29" of receptacles 28 for kneading bolts 24 in the centre section 34' of the upper housing half 14 one row, namely the centre row 29', is equipped with kneading bolts 24, whereas the upper row 29 and the lower row 29" are not equipped with kneading bolts 24. In the middle section 34' of the lower housing half 14' there are two rows, namely the upper and lower row, fitted with kneading bolts, so that the middle section 34' of the housing 10 altogether has three rows of opposing kneading bolts 24. The raw material to be mixed is added to the mixing and kneading machine 100 via the filling funnel 36, then guided through process sections 34, 34', 34" and finally discharged via the outlet opening 38. Instead of the depicted process sections 34, 34', 34", the mixing and kneading machine 100 according to the invention can also have more process sections, in particular four process sections, or fewer process sections such as two or one process section.

According to the invention, the worm shaft 12 for a mixing and kneading machine according to the present invention is designed such that the blade elements 22 on the circumferential surface of the shaft bar 20, are arranged at least in a section extending in the axial direction of the worm shaft 12, like the middle process section 34' shown in FIG. 1b, in three rows extending in the axial direction of the worm shaft 12, i.e. the worm shaft 12 is designed in some sections to be two-bladed, and at least one of the blade elements of one of the rows is different from one of the blade elements of one of the other rows and/or the rows of blade elements, viewed in the cross-section of the shaft rod, are distributed unevenly over the circumference defined by the outer circumferential surface of the shaft rod.

Figure 2A:
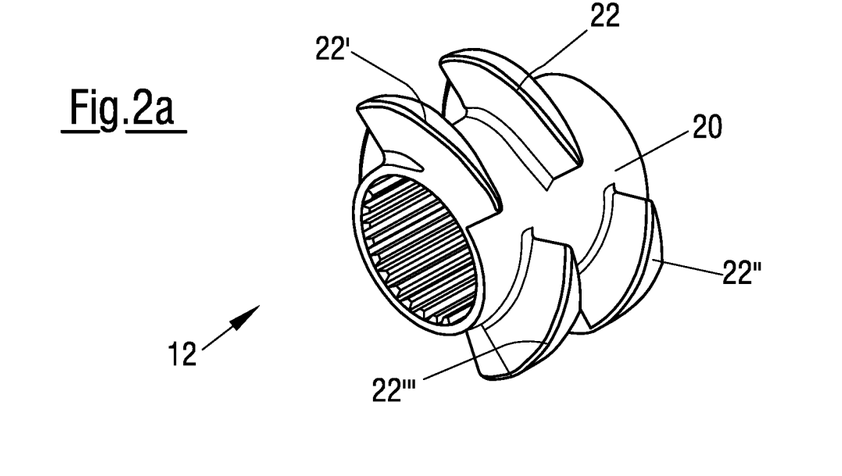
FIG. 2a shows a perspective view of an axial section of a worm shaft according to an embodiment of the present invention.
Figure 2B:
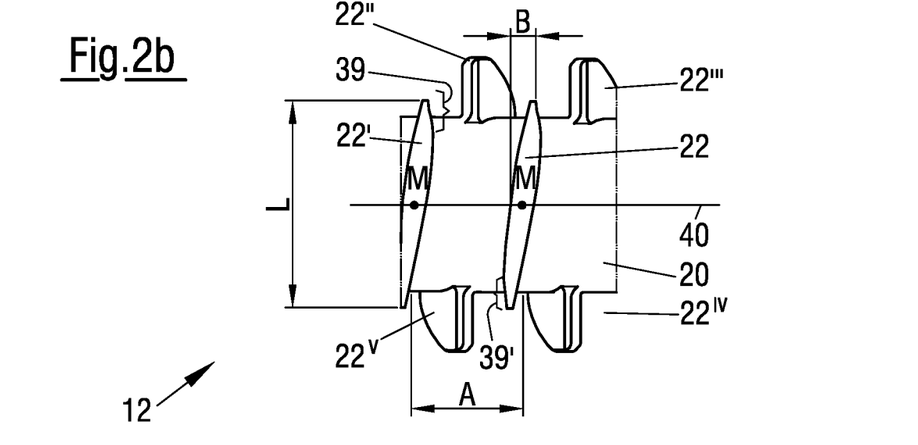
Figure 2C:
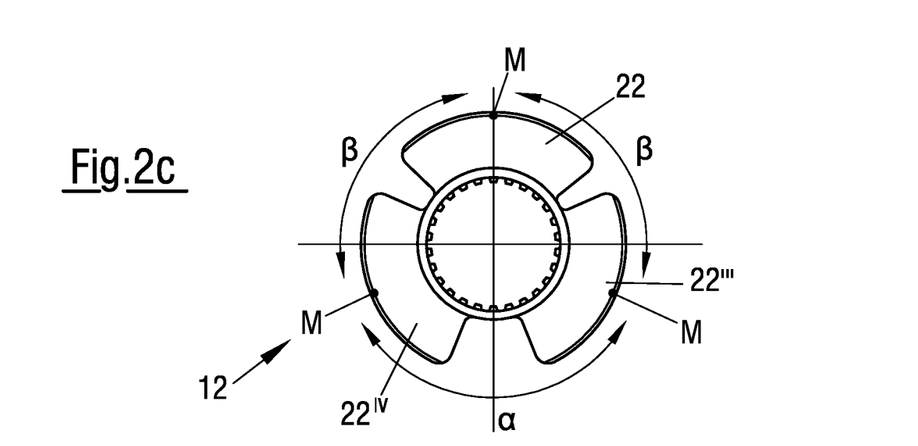

Such a three-bladed section of a worm shaft 12 according to a preferred embodiment of the present invention is shown in FIGS. 2a, 2b, and 2c. The blade elements 22, 22', 22", 22''', 22$^{iv}$, and 22" are arranged on the cylindrical shaft rod 20 of the worm shaft 12, extending radially outwards from the circumferential surface of the shaft rod 20. Here the individual blade elements 22, 22', 22", 22''', 22$^{iv}$, and 22" are configured such that in a top view they have modified biconvex outer circumferential surfaces in which the two ends of the outer circumferential surfaces, viewed over the longitudinal extension of the blade elements, are configured in the form of an edge and one flank each of the two opposing end sections has a straight section 39, 39'. The longitudinal extensions L of the blade elements 22, 22', 22", 22''', 22$^{iv}$, and 22" extend nearly perpendicularly to the longitudinal direction of the worm shaft 12. By longitudinal extension L, the longest possible straight line between two different points on the outer circumferential surface of a blade element 22, 22', 22", 22''', 22$^{iv}$, 22", i.e. the length L in this case, is to be understood. All blade elements 22, 22', 22", 22''', 22$^{iv}$, 22$^v$ have the same form and the same dimensions. The ratio of the length L to the width B of the individual blade elements 22, 22', 22", 22''', 22$^{iv}$, 22$^v$ is around 8.5, wherein the width B is the longest straight extension of the outer circumferential surface of the blade elements 22, 22', 22", 22''', 22$^{iv}$, 22", which extends perpendicularly to the length L of the blade elements 22, 22', 22", 22''', 22$^{iv}$, 22$^v$.

Here both the axially spaced blade elements 22, 22' are arranged in an axially extending row 40 as well as the axially spaced blade elements 22", 22''' as well as 22$^{iv}$, 22$^v$ are arranged in an axially extending row. An axially extending row 40 of blade elements 22, 22', 22", 22''', 22$^{iv}$, 22$^v$ is present according to the present invention when—as shown in the embodiment shown in FIGS. 2a, 2b, and 2c-a connecting line drawn over the midpoints M of the outer circumferential surface of blade elements 22, 22' being spaced apart in the axial direction is a straight line. The midpoint M of a blade element 22, 22' here is the point which lies in the middle of the length L of the blade element 22, 22'. The ratio of the axial distance A of the adjacent blade elements 22, 22' of the row 40 in each case is around 5.5. Here the width B of the blade element is as defined above, and the axial distance A of two axially adjacent blade elements 22, 22' is the distance between the midpoints M of the outer circumferential surfaces of the axially adjacent blade elements 22, 22'. One of the three-viewed in the cross-section of the shaft rod 20—adjacent blade elements 22 in the circumferential direction of the shaft rod 20 is axially displaced slightly with respect to the other two blade elements 22", 22$^{iv}$. All of the blade elements 22, 22', 22", 22''', 22$^{iv}$, 22$^v$ extend respectively over the same angular section of 115° over the (outer) circumferential surface or shell surface of the shaft rod 20.

However, the rows 40 of the blade elements 22, 22', 22", 22''', 22$^{iv}$, 22", viewed in the cross-section of the shaft rod 20, are distributed irregularly over the circumference defined by the outer circumferential surface of the shaft rod 20. The angular distance a of the midpoints M between the blade elements 22''', 22$^{iv}$ on the circumferential surface of the shaft rod 20 is 135°, whereas the angular distances β of the midpoints M between the blade elements 22, 22''' and 22, 22$^{iv}$ on the circumferential surface of the shaft rod 20 are in each case 112.5°.

Figure 3A:
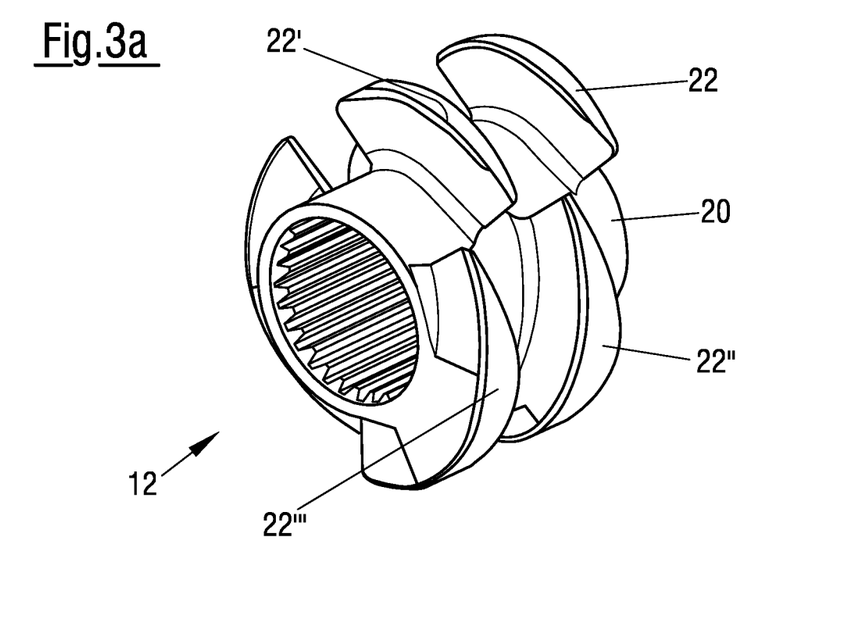
FIG. 3a shows a perspective view of an axial section of a worm shaft according to a further embodiment of the present invention.
Figure 3B:
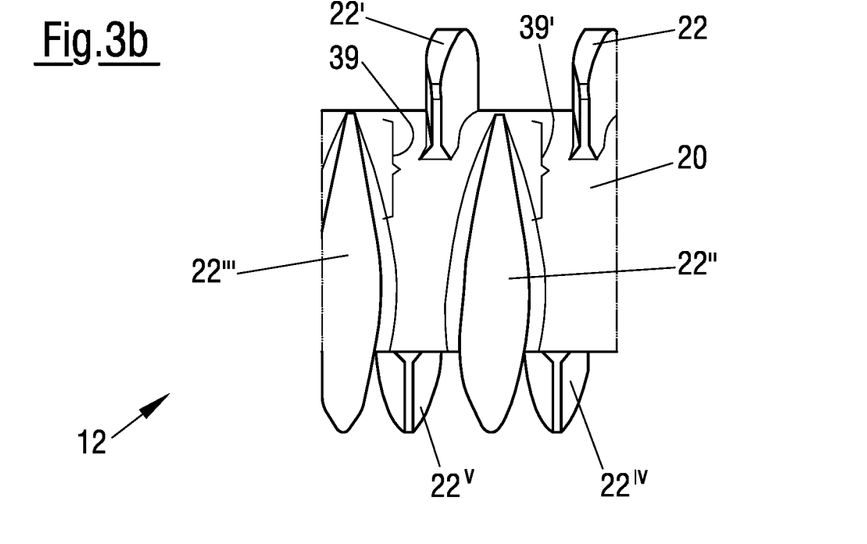

FIGS. 3a and 3b show a three-bladed section of a worm shaft 12 according to a further preferred embodiment of the present invention. The outer circumferential surfaces of the blade elements 22, 22', as in the embodiment of FIGS. 2a, 2b, and 2c, are configured to be modified biconvex, whereas the outer circumferential surfaces of the blade elements 22", 22''', 22$^{iv}$, 22$^v$ of the other two rows have a different, likewise modified biconvex shape, wherein the outer circumferential surfaces of the blade elements 22", 22''', 22$^{iv}$, 22$^v$ are however wider than those of the blade elements 22, 22', and in the 22", 22''', 22$^{iv}$, 22$^v$ the two equal ends of the lateral flanks have a straight section 39, 39'.

Figure 4A:
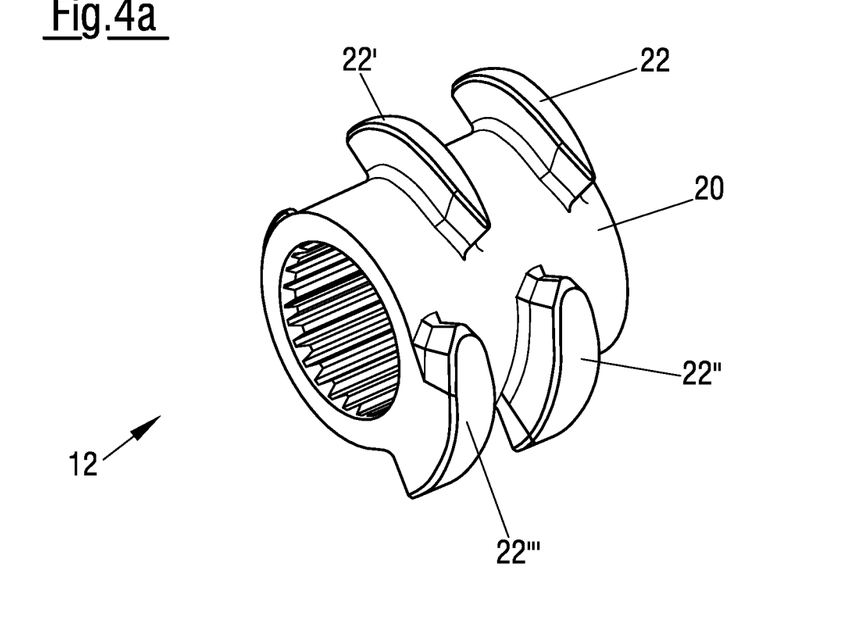
FIG. 4a shows a perspective view of an axial section of a worm shaft according to a further embodiment of the present invention.
Figure 4B:
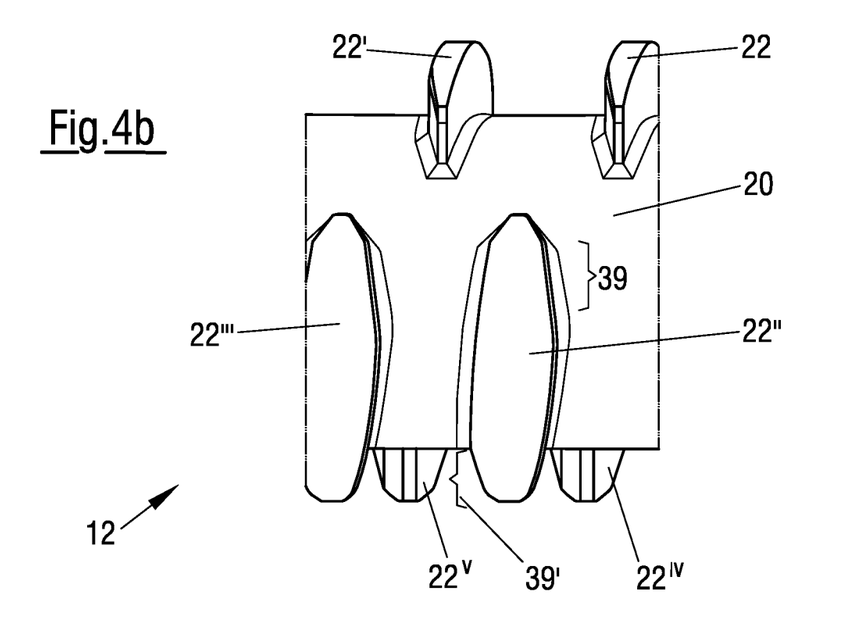

FIGS. 4a and 4b show a three-bladed section of a worm shaft 12 according to a further preferred embodiment of the present invention. The outer circumferential surfaces of the blade elements 22, 22' are as in the embodiment of FIGS. 2a, 2b, and 2c, configured in a modified biconvex shape, whereas the outer circumferential surfaces of the blade elements 22", 22''', 22$^{iv}$, 22$^v$ of the other two rows have a different, likewise modified biconvex shape, wherein the outer circumferential surfaces of the blade elements 22", 22''', 22$^{iv}$, 22$^v$ are however wider than the blade elements 22, 22', the end sections of the outer circumferential surfaces of the blade elements 22", 22''', 22$^{iv}$, 22$^v$ are configured in the shape of a trapezoid which tapers toward the ends, and in the blade elements 22", 22''', 22$^{iv}$, 22$^v$ the two opposing ends of the lateral flanks have a straight section 39, 39'.

Figure 5:
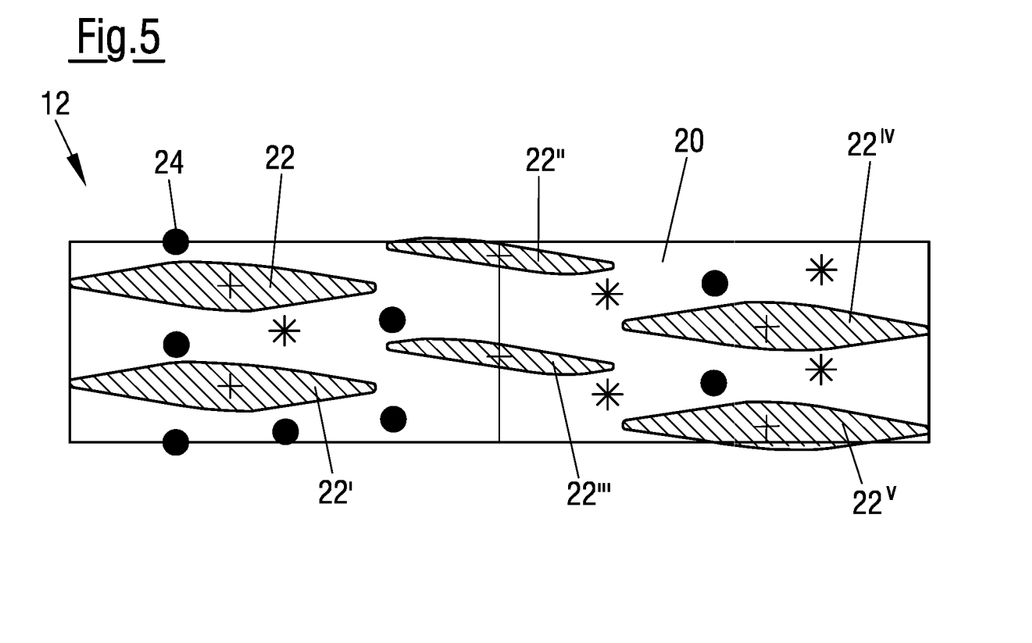
FIG. 5 shows the processing of the shell surface of the shaft rod of an axial section of the worm shaft with the blade elements disposed thereon and kneading elements protruding into a gap between the blade elements according to a further embodiment of the present invention.

FIG. 5 shows the design of the shell surface of a shaft rod 20 of an axial section of a worm shaft 12 with blade elements 22, 22', 22", 22''', 22$^{iv}$, 22$^v$ arranged thereon, and the kneading elements 24 extending into the space between the blade elements 22, 22', 22", 22''', 22$^{iv}$, 22$^v$ according to an exemplary embodiment of the present invention. During operation of the mixing and kneading machine, the worm shaft 12 rotates and at the same time moves axially in translation back and forth once per rotation. The kneading elements 24 thereby move along the lateral flanks of the blade elements 22, 22', 22", 22''', 22$^{iv}$, 22$^v$ back and forth and also move back and forth in the space between the blade elements 22, 22" or 22''', 22$^{iv}$ being adjacent in the circumferential direction of the shaft rod 20. The outer circumferential surfaces of the blade elements 22, 22', 22", 22''', 22$^{iv}$, 22$^v$ are in each case parallelogram-shaped, wherein the four blade elements 22, 22''', 22$^{iv}$, 22$^v$ are however longer and wider than the two blade elements 22", 22'''.

Figure 6:
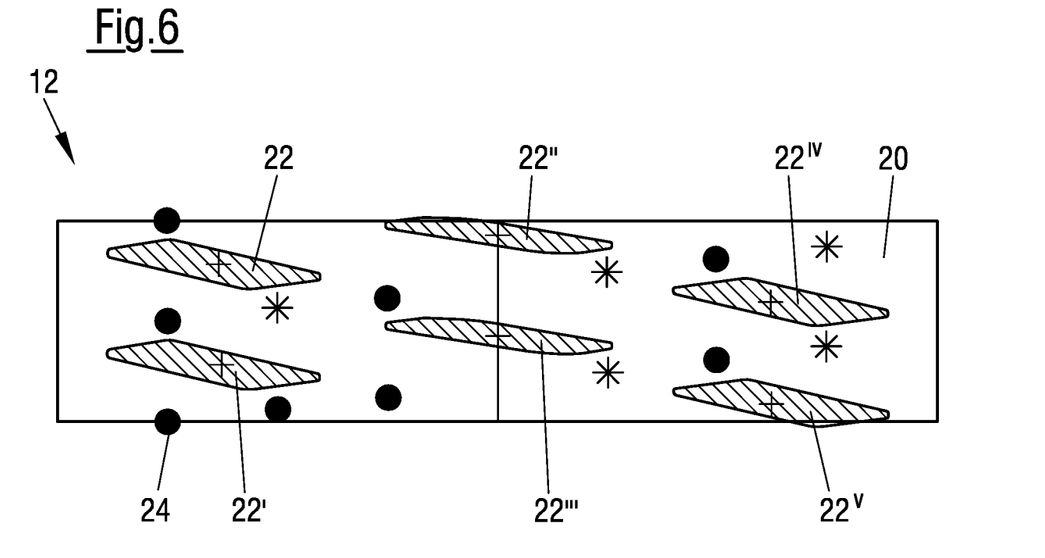
FIG. 6 shows the processing of the shell surface of the shaft rod of an axial section of a worm shaft with the blade elements disposed thereon and kneading elements protruding into a gap between the blade elements according to another embodiment of the present invention.

FIG. 6 shows an alternative embodiment to that of FIG. 5. In the embodiment shown in FIG. 6, the blade elements 22, 22', 22", 22''', 22$^{iv}$, 22$^v$ are likewise parallelogram-shaped, wherein the four blade elements 22, 22''', 22$^{iv}$, 22$^v$ are however shorter and wider than the two blade elements 22", 22'''.

LIST OF REFERENCE SYMBOLS

10 Housing
12 Worm shaft
14, 14' Housing half
16 Housing shell
18 Hollow inner space
20 Shaft rod
22, 22', 22", 22''' 22$^{iv}$, 22$^v$ Blade element
24 Kneading element/kneading bolt
28 Receptacle/drilled hole for kneading element
29, 29', 29" (Axially extending) row of receptacles for kneading elements
34, 34', 34" Process section
36 Filling funnel
38 Outlet opening
39, 39' Straight section of a modified biconvex blade element 40 (Axially extending) row of blade elements
42 Lateral flank of a blade element
100 Mixing and kneading machine
α Angular distance between the midpoints of two blade elements on the circumferential surface of the shaft rod
β Angular distance between the midpoints of two blade elements on the circumferential surface of the shaft rod
A Axial distance A of two adjacent blade elements of a row
B Width (longest straight extension of the outer circumferential surface of the blade element, which extends perpendicularly to the length of the blade element)
L Length (longest straight extension of the outer circumferential surface of the blade element)
M Midpoint of the outer circumferential surface of a blade element

What is claimed is:

1. A worm shaft (12) for a mixing and kneading machine (100) having a shaft rod (20) having a circular cross-section, on the circumferential surface of which blade elements (22, 22', 22", 22''', $22^{iv}$, $22^v$) are arranged which are spaced apart from one another and which extend outwards from the circumferential surface of the shaft rod (20) wherein the blade elements (22, 22', 22", 22''', $22^{iv}$, $22^v$) are arranged on the circumferential surface of the shaft rod (20), at least in one section extending in the axial direction of the worm shaft (12), in three rows (40) extending in the axial direction of the worm shaft (12), wherein the entire circumferential surface of this section extending in the axial direction of the worm shaft (12) does not comprise any further blade elements except those arranged in the three rows (40), wherein i) at least one of the blade elements (22, 22', 22", 22''', $22^{iv}$, $22^v$) of at least one other of the both rows (40) is different from one of the blade elements (22, 22', 22", 22''', $22^{iv}$, $22^v$) of one of the other rows (40) by being shorter and/or narrower, and/or ii) the rows (40) of the blade elements (22, 22', 22", 22''', $22^{iv}$, $22^v$), viewed in cross-section of the shaft rod (20), are distributed irregularly over the circumference defined by the outer circumferential surface of the shaft rod (20), so that the angular distance between the midpoints M of the outer circumferential surfaces of the blade elements (22, 22', 22", 22''', $22^{iv}$, $22^v$) on the circumferential surface of the shaft rod (20) of adjacent rows (40) differs between at least two of the three rows (4) of the at least other two rows (40);
wherein the angular distance a between the midpoints M of the outer circumferential surface of the blade element (22, 22', 22", 22''', $22^{iv}$, $22^v$) of two of the three rows (40) of the at least one section extending in the axial direction of the worm shaft (12) on the circumferential surface of the shaft rod (20) is 124° to 146°, and the angular distances between the midpoint M of the outer circumferential surfaces of the other row and each of the midpoints M of the outer circumferential surface of the two rows (40) on the circumferential surface of the shaft rod (20) are 102° to 123°.

2. The worm shaft (12) according to claim 1, characterized in that at least 80% of the blade elements (22, 22', 22", 22''', $22^{iv}$, $22^v$) of each row (40) of the at least one section extending in the axial direction of the worm shaft (12) are identical to one another.

3. The worm shaft (12) according to claim 1, characterized in that the length of the section of the worm shaft (12) extending in the axial direction, in which the blade elements (22, 22', 22", 22''', $22^{iv}$, $22^v$) are arranged in three rows (40) extending in the axial direction of the worm shaft (12), is at least 0.2 D of the length of the worm shaft (12), wherein D is diameter of the worm shaft.

4. The worm shaft (12) according to claim 1, characterized in that each of the blade elements (22, 22', 22", 22''', $22^{iv}$, $22^v$) of the at least one section extending in the axial direction of the worm shaft (12) has a longitudinal extension which extends in an angle of 45° to 135° to the axial direction of the worm shaft (12).

5. The worm shaft (12) according to claim 1, characterised in that at least 50% of the blade elements (22, 22', 22", 22''', $22^{iv}$, $22^v$) of the at least one section extending in the axial direction of the worm shaft (12), in the top view, has an outer circumferential surface in a form being selected from the group consisting of parallelogram-shaped, elliptical, oval, and biconvex.

6. The worm shaft (12) according to claim 5, characterized in that all of the blade elements (22, 22', 22", 22''', $22^{iv}$, $22^v$) of a row (40) have the same shape, wherein the shape of the blade elements (22, 22', 22", 22''', $22^{iv}$, $22^v$) of two of the three rows (40) is the same and differs from the shape of the blade elements (22, 22', 22", 22''', $22^{iv}$, $22^v$) of the third row (40).

7. The worm shaft (12) according to claim 1, characterized in that the blade elements (22, 22', 22", 22''', $22^{iv}$, $22^v$) of two of the three rows (40) of the at least one section extending in the axial direction of the worm shaft are identical to one another, and the blade elements (22, 22', 22", 22''', $22^{iv}$, $22^v$) of the third row (40) have the same or different shape as the blade elements (22, 22', 22", 22''', $22^{iv}$, $22^v$) of the other rows (40), wherein the blade elements (22, 22', 22", 22''', $22^{iv}$, $22^v$) of the third row (40) is 1 to 25% longer, shorter, narrower, or wider than the blade elements (22, 22', 22", 22''', $22^{iv}$, $22^v$) of the other two rows (40).

8. The worm shaft (12) according to claim 1, characterized in that the blade elements (22, 22', 22", 22''', $22^{iv}$, $22^v$) of two of the three rows (40) of the at least one section extending in the axial direction of the worm shaft (12) are identical to one another, and the angular distance a between the midpoints M of the outer circumferential surfaces of the blade elements (22, 22', 22", 22''', $22^{iv}$, $22^v$) of the two rows (40) on the circumferential surface of the shaft rod (20) differs from the angular distance between the midpoint M of the outer circumferential surfaces of the other row, and from each of the midpoints M of the outer circumferential surface of the two rows (40) on the circumferential surface of the shaft rod (20).

9. The worm shaft (12) according to claim 1, characterized in that each of the blade elements (22, 22', 22", 22''', $22^{iv}$, $22^v$) of two of the three rows (40) of the at least one section extending in the axial direction of the worm shaft (12)—viewed in the cross-section of the shaft rod (20)—extends over the same angular distance of the circumferential surface of the shaft rod (20) and each of the blade elements (22, 22', 22", 22''', $22^{iv}$, $22^v$) of the other row (40) extends over a shorter or longer angular section, wherein the difference between the angular distances is 1 to 20%.

10. The worm shaft (12) according to claim 1, characterized in that each of the blade elements (22, 22', 22", 22''', $22^{iv}$, $22^v$) of two of the three rows (40) of the at least one section extending in the axial direction of the worm shaft (12)—viewed in the cross-section of the shaft rod (20)—extends over an angular distance of 20° to 175° of the circumferential surface of the shaft rod (20) and each of the blade elements (22, 22', 22", 22''', $22^{iv}$, $22^v$) of the other of the three rows (40) extends over an angular distance of 20° to 120°.

11. A housing (10) of a mixing and kneading machine (100) for continuous preparation processes, wherein in the housing (10) a hollow inner space (18) is formed in which, at least in sections in the axial direction, a worm shaft (12) according to claim 1 extends, and wherein on the inner circumferential surface of the housing (10) receptacles (28) for kneading elements (24) extending at least in sections into the housing (10) are arranged, wherein the receptacles (28) on the inner circumferential surface of the housing (10) are arranged in at least three rows (29, 29', 29") extending in the axial direction over at least one section of the inner circumferential surface of the housing (10).

12. A mixing and kneading machine (100) for continuous preparation processes such as the production of polymer granulates, polymer extruded profiles, or polymer moulded parts, comprising a housing according to claim 11.

\* \* \* \* \*